United States Patent

[11] 3,557,324

[72] Inventor Yoshiro Nakamatsu,
62, Shimoumacho-2-chome, Setagaya-ku,
Tokyo, Japan

[21] Appl. No. 664,156
[22] Filed Aug. 29, 1967
[45] Patented Jan. 19, 1971
[32] Priority Apr. 28, 1967, June 22, 1967, June 22, 1967
[33] Japan
[31] 42/27,051, 42/39,783 and 42/39,784

[54] TELEVISION RECEIVER HAVING MEANS FOR CAUSING SOUND TO EMANATE FROM PICTURE PLANE
1 Claim, 12 Drawing Figs.

[52] U.S. Cl. ........ 179/181, 179/1, 178/7.82
[51] Int. Cl. ........ H04r 7/46
[50] Field of Search ........ 179/1, 181; 181/31; 178/7.9

[56] References Cited

UNITED STATES PATENTS

| | | | |
|---|---|---|---|
| 1,452,827 | 4/1923 | DeForest | 179/181 |
| 2,044,608 | 6/1936 | Harford | 179/181 |
| 2,210,477 | 8/1940 | Benecke | 181/31 |
| 2,388,761 | 11/1945 | Patterson | 178/7 |
| 2,896,736 | 7/1959 | Karlson | 181/31 |

FOREIGN PATENTS

| | | | |
|---|---|---|---|
| 1,203,126 | 7/1959 | France | 178/7 |
| 863,884 | 3/1961 | Great Britain | 178/7 |

*Primary Examiner*—Kathleen H. Claffy
*Assistant Examiner*—Douglas W. Olms
*Attorney*—Jecies and Grenside

ABSTRACT: A sound device for television receivers having means emitting or reflecting sound in front of the screen of the picture tube to direct the sound toward a viewer so that the sound can be heard as if it were emanating from the picture screen of the television receiver.

PATENTED JAN 1 9 1971

3,557,324

SHEET 1 OF 3

INVENTOR

Yoshiro Nakamatsu

BY Jecies and Greenside

ATTORNEYS

INVENTOR

Yoshiro Nakamatsu

BY Jecies and Greenside

ATTORNEYS

INVENTOR

Yoshiro Nakamatsu

BY Jecies and Greenside

ATTORNEYS

TELEVISION RECEIVER HAVING MEANS FOR CAUSING SOUND TO EMANATE FROM PICTURE PLANE

BACKGROUND OF THE INVENTION

1. Field of the Invention

This invention relates to television receivers having means for causing sounds to emanate from the picture plane thereof, and more particularly to a novel sound device for use with the television receivers of the kind described above.

2. Description of the Prior Art

In conventional television receivers, the speaker is generally disposed on either side of or beneath the cathode-ray tube in view of the fact that the cathode-ray tube occupies, substantially, the central area of the television receiver cabinet. Due to the above difference between the position of the cathode-ray tube and the position of the speaker, that is, the position of the sound emanation source, it has been the fundamental defect of the conventional television receiver that the picture being reproduced on the screen of the cathode-ray tube is observed by a viewer with a certain sense of inconsistency with the sound emanating from the speaker.

SUMMARY OF THE INVENTION

It is therefore the primary object of the present invention to provide a novel sound device for use with a television receiver by which the sound can emanate from the picture plane, that is, the screen of the cathode-ray tube as in the case of motion pictures for thereby imparting a vivid and strong appeal to the television picture similar to the appeal given by the motion picture.

DESCRIPTION OF THE PREFERRED EMBODIMENTS

Figure 1:
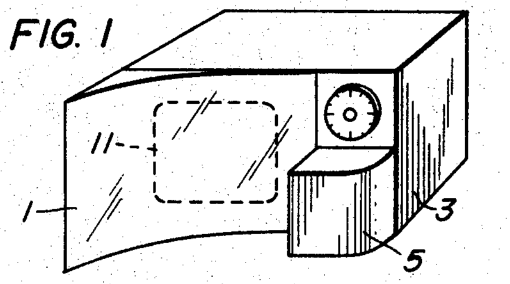
FIG. 1 is a schematic perspective view of a television receiver integrally equipped with a sound device embodying the present invention.
Figure 3:
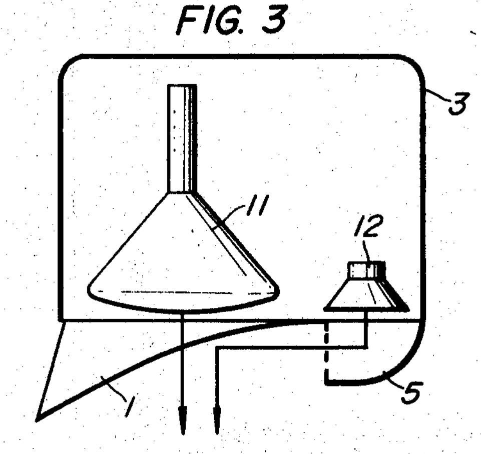
FIG. 3 is a plan view of FIG. 1 with the cabinet upper cover removed to show the arrangement of the sound device relative to the cathode-ray tube.

Referring to FIG. 1, a television receiver integrally equipped with one form of the sound device according to the invention comprises a light-transmissive viewing plate or sound lens 1 of curved contour disposed forwardly of a cathode-ray tube 11 situated in the television receiver cabinet 3. The sound lens 1 may be transparent, or may be tinted with a color such as light blue, or may bear a pattern of vertical stripes or dots, and may preferably be disposed in a manner as shown in FIG 3. A sound reflecting plate 5 of curved contour is disposed in front of a speaker 12 so that the sound emanating from the speaker 12 can be reflected by the reflecting plate 5 and then by the sound lens 1 and proceed forwardly toward the viewer as if it were emanating from the picture plane. By virtue of the provision of the device as described above, the sound can emanate from the picture plane as if the speaker 12 were disposed within the cathode-ray tube 11.

Figure 2:
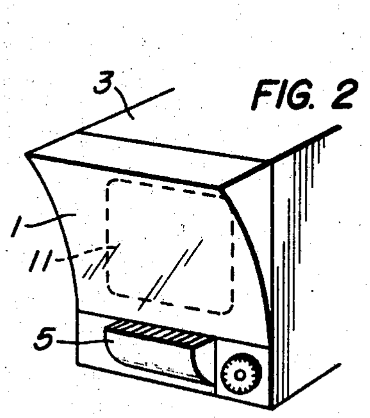
FIG. 2 is a schematic perspective view of a television receiver integrally equipped with a modified form of the sound device embodying the present invention.

In FIG. 2, a television receiver is shown as having a speaker which is disposed beneath a cathode-ray tube 11. The sound device preferred for application to this kind of television receiver comprises a suitable combination of a sound reflecting plate 5 of curved contour and a light-transmissive viewing plate or sound lens 1 of curved contour which can direct the sound from the speaker in such a way that the sound appears to emanate from the picture plane.

The television receivers referred to above are those especially made for the practice of the present invention, but it will be understood that the sound device according to the invention can be easily affixed to conventional television receivers.

Figure 4:
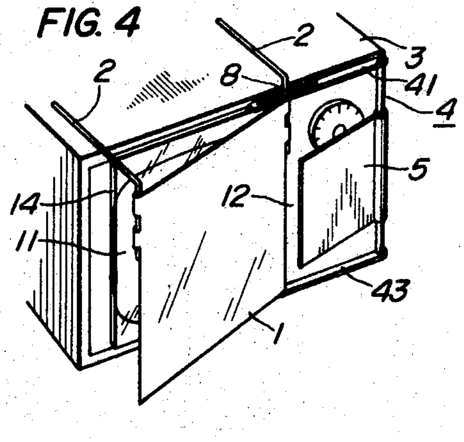
FIG. 4 is a schematic perspective view of one form of the sound device of the present invention when it is affixed to a conventional television receiver.
Figure 5:
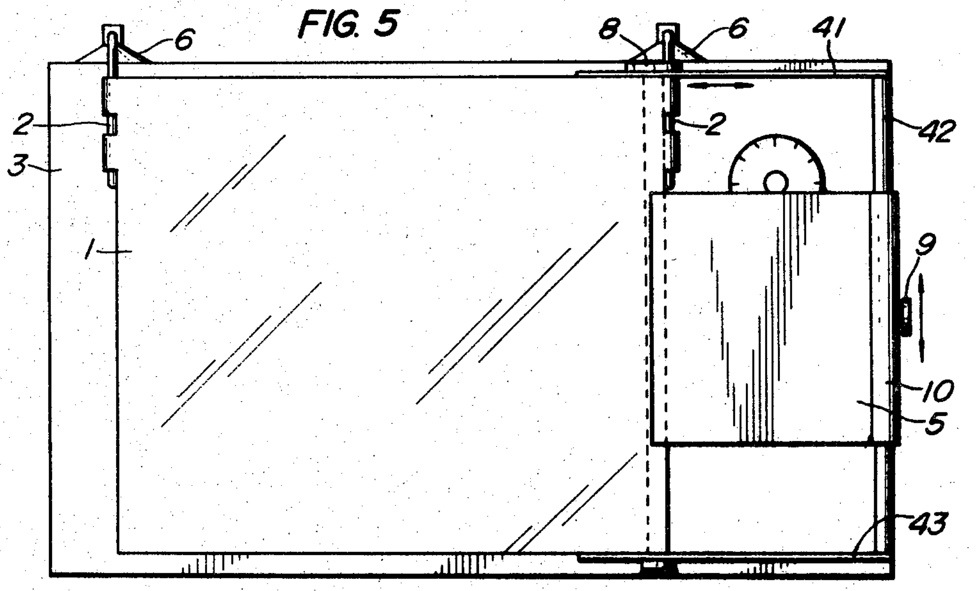
FIG. 5 is an enlarged front elevational view of FIG. 4.
Figure 6:
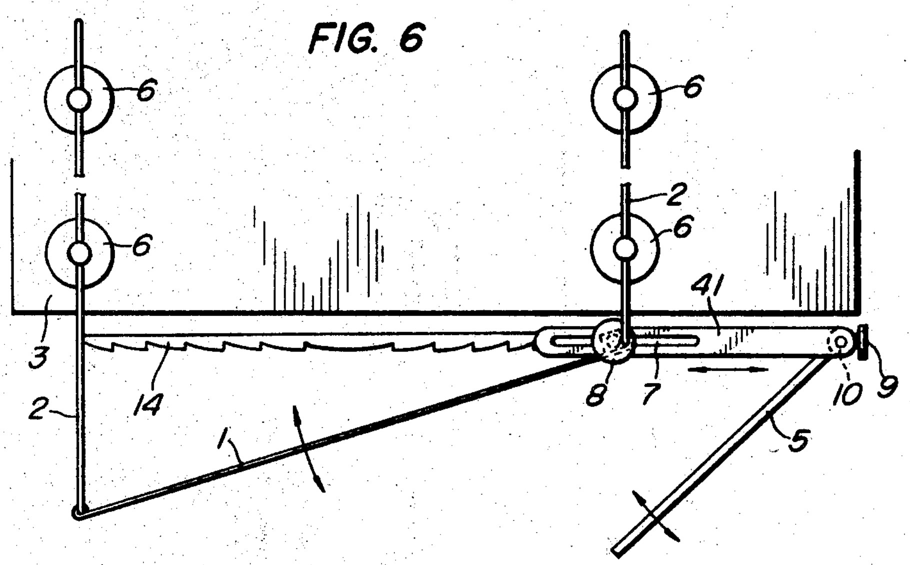
FIG. 6 is an enlarged top plan view of FIG. 4.

Referring to FIG. 4, a light-transmissive viewing plate or sound lens 1 such as an acrylic plate which may be transparent, or may be tinted with a light blue or like color, or may bear a pattern of vertical stripes or dots is disposed forwardly of a cathode-ray tube 11 situated in the cabinet 3 of a conventional television receiver at an angle with respect to the picture plane, and a sound reflecting plate 5 is disposed forwardly of a speaker section 12 of the television receiver at an angle with respect thereto. A substantially U-shaped frame member 4 consisting of two horizontal rods 41 and 43 and one vertical rod 42 is connected, in a manner as will be described later, with one side edge of the sound lens 1, and the sound reflecting plate 5 is vertically movably mounted on the vertical rod 42 of the U-shaped frame member 4. The assembly comprising the sound lens 1, the sound reflecting plate 5 and the U-shaped frame member 4 is arranged to suspend downwardly in front of the television receiver by means of hanger arms 2. A Frenell lens plate 14 may be optionally attached to the sound lens 1 for enlargement of picture image The structure of the attaching device shown in FIG. 4 will be described in more detail with reference to FIGS. 5 and 6. As shown in FIGS. 5 and 6, the hanger arms 2 extend from the opposite ends of the upper side of the sound lens 1 and have a plurality of sucking or vacuum discs 6 of rubber or like material provided thereon to fix the sound lens 1 to the upper cover of the receiver cabinet 3. The horizontal rods 41 and 43 have a slot 7 of suitable length bored therethrough so that screws 8 can be passed through the slots 7 into threaded holes located near the upper and lower ends of one side of the sound lens 1 for thereby adjustably fixing the U-shaped frame member 4 to the sound lens 1. The sound reflecting plate 5 has a tubular end portion 10 which is vertically, slidably mounted on the vertical rod 42 so that a screw 9 can fix the sound reflecting plate 5 at a desired position on the vertical rod 42 of the U-shaped frame member 4.

By virtue of the above structure, the horizontal distance between the sound lens 1 and the sound reflecting plate 5 is freely adjustable by merely loosening the screws 8, moving the horizontal rods 41 and 43 towards and away from the sound lens 1, and refastening the screws 8. On the other hand, the vertical distance between the sound lens 1 and the sound reflecting plate 5 is also freely adjustable by merely loosening the screw 9, moving the reflecting plate 5 on the vertical rod 42, and refastening the screw 9. Thus, the relative distance between the sound reflecting plate 5 and the sound lens 1 is freely adjustable in both the vertical and horizontal directions, and the sound device of the invention can be mounted on conventional television receivers of any size.

Figure 7:
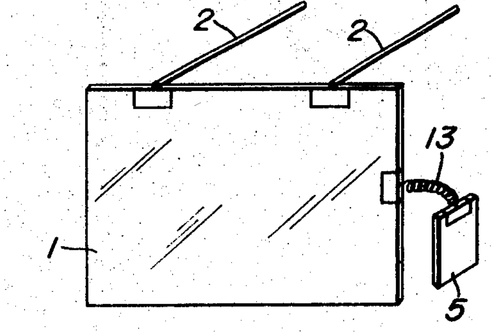
FIG. 7 is a schematic perspective view of another form of the sound device of the present invention when it is affixed to a conventional television receiver.

In FIG. 7 there is shown another form of the attaching device according to the invention. The device comprises a light-transmissve viewing plate or sound lens 1 and a sound reflecting plate 5 which are connected to each other by means of a flexible member 13 such as a lead rod about which a resilient member such as a coil spring is coiled. Thus, the relative distance between the sound reflecting plate 5 and the sound lens 1 is freely adjustable, and the entire device can be mounted on a conventional television receiver by means of hanger arms 2.

Figure 8:
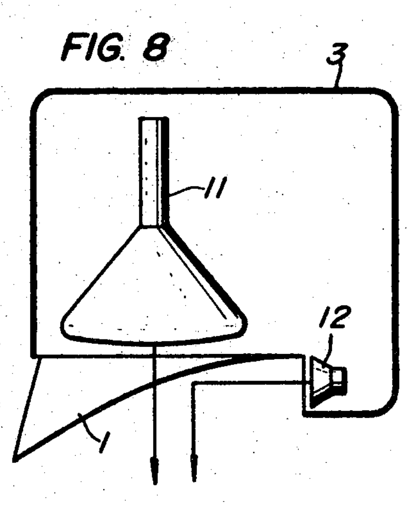
FIG. 8 is a plan view of a television receiver integrally equipped with another form of the sound device of the present invention, with the cabinet upper cover removed to show the arrangement of the sound orienting device relative to the cathode-ray tube.

In a further form of the device of the invention shown in FIG. 8, a speaker 12 is disposed at right angles with respect to a cathode-ray tube 11 and a sound lens 1 is disposed forwardly of the cathode-ray tube 11 so that the sound lens 1 can singly reflect the sound from the speaker 12 to direct the sound as if it were emanating from the picture surface.

Figure 9:
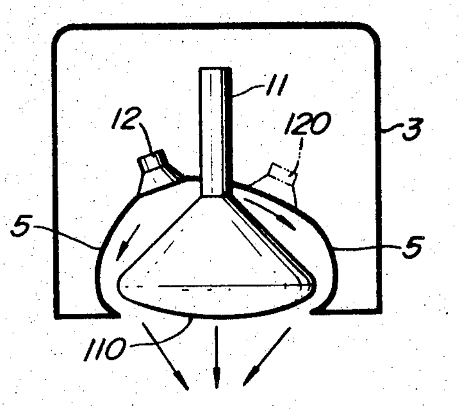
FIG. 9 is a plan view showing another form of the sound device according to the present invention.

In a still further form of the device according to the invention shown in FIG. 9, a speaker 12 and/or a speaker 120 are disposed substantially rearwardly of a cathode-ray tube 11, and sound reflecting plates 5 are disposed on both sides of the cathode-ray tube 11 so that the sound emanating from the speaker 12 and/or speaker 120 can be directed forwardly by being guided by the sound reflecting plates 5 and then by the surface of picture plane 110, and the sound can be heard as if it were emanating from the picture surface.

Figure 10:
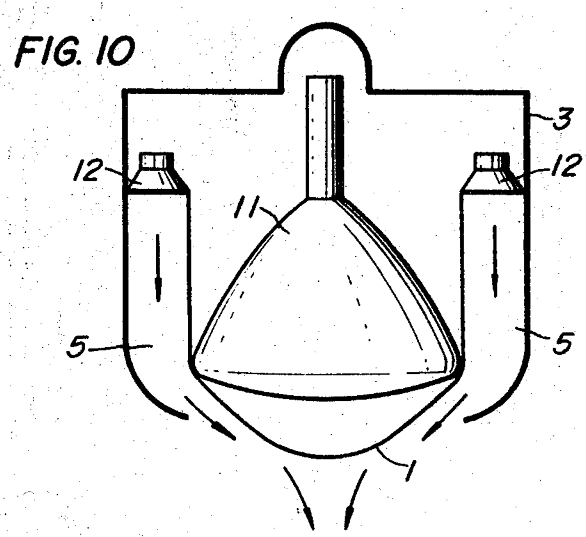
FIG. 10 is a plan view showing another form of the present invention, having two speakers and a sound reflecting lens in front of the picture tube.

In FIG. 10 there is shown another form of the device according to the invention which is generally similar to that shown in FIG. 9 in that the sound emanating from two speakers 12 is directed forwardly of a cathode-ray tube 11 by being guided by sound reflecting plates 5. However, in the form of the invention shown in FIG. 10, a viewing plate or sound lens 1 which is a lenticular member formed from a transparent resin material such as an acrylic resin is provided or bonded to the front face of the cathode-ray tube 11 to make up for the small curvature of the cathode-ray tube 11. It will be seen that the sound lens 1 acts to guide the sound therealong which is therefore directed forwardly of the picture surface toward a viewer.

Figure 11:
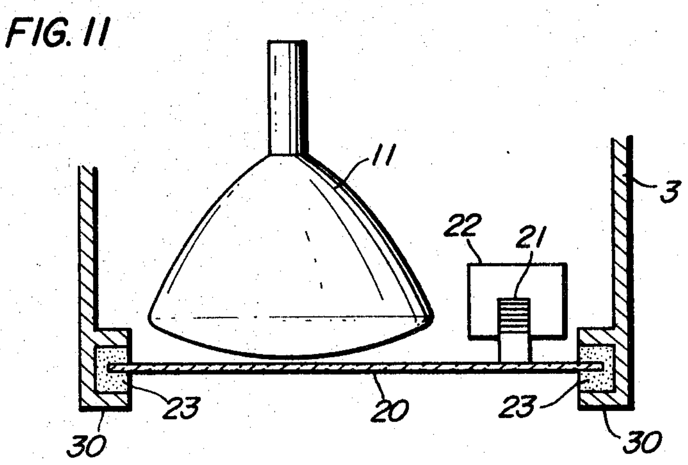
FIG. 11 is a partly sectional plan view showing another form of the present invention, using a transparent sound speaker, and, FIG. 12 is a plan view showing another form of the transparent sound speaker which is a part of the present invention.

FIG. 11 shows still another form of the invention, in which it will be seen that a protective glass sheet 20 disposed in front of a cathode-ray tube 11 and forming part of the television receiver cabinet 3 is resiliently supported at opposite ends in blocks 23 of foamed rubber, polyurethane or like material received in opposite recesses at front corners 30 of the cabinet 3. A moving coil 21 driven by a driving magnet 22 is operatively connected to the protective glass sheet 20 at a position adjacent to one end of the latter. It will be readily known that the transparent glass sheet 20 is caused to vibrate to emanate sound when the television sound signal is transmitted to the moving coil 21, and the picture being reproduced on the screen of the cathode-ray tube 11 disposed behind the protective glass sheet 20 can be easily seen through the glass sheet 20 which is transparent.

Figure 12:
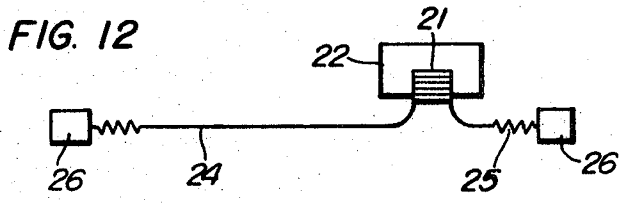

In yet another form of the invention shown in FIG. 12, a moving coil 21 driven by a driving magnet 22 is operatively connected to an offcenter position of a substantially flat-shaped cone or vibration element 24. The vibration element 24 is made from, for example, a transparent plastic material and is fixed at opposite ends thereof to stationary frame portions 26 of the television receiver cabinet through flexible members 25. Therefore the picture being reproduced on the screen of a cathode-ray tube (not shown) disposed behind the substantially flat vibration element 24 can be seen through the vibration element 24 which is transparent.

Various modifications and changes may be made in the embodiments of the present invention referred to in the above, and all these modifications and changes should be considered to be included in the present invention provided that they do not depart from the spirit of the invention.

The present invention having the structure as described above has the following features:

1. Television receivers equipped with the sound device of the invention exhibit a notable effect of strong appeal similar to that given by motion pictures since the sound emanates from the picture plane.

2. The device is simple in structure, inexpensive and robust.

3. Conventional television receivers can be easily modified by merely affixing the device of this invention in the attachment form.

4. The sound lens or sound emitting plate serves also as a protector for the cathode-ray tube, and absence of any reflection of external light by virtue of employment of the curved contour or angular disposition of the sound lens improves the visibility of the picture.

5. In the case of the television receiver shown in FIG. 2, the overhanging structure of the cabinet upper cover in the form of a pent roof serves as a shield for external light and thus improves the visibility of the picture even in a bright place.

6. The picture quality is improved since the sound is reflected by the reflecting plate and the sound lens and advances directly toward the viewer.

7. The structure becomes compact especially in case of the device shown in FIG. 11.

I claim:

1. A television receiver comprising a picture tube having a screen for presenting a picture, coil means energized by electrical acoustical signals and mounted proximate said screen laterally offset therefrom, and means in physical contact with said coil means and driven thereby for translating said electrical signals into sound waves, said last-named means comprising a resiliently supported planar light transmitting vibration element consisting of a material selected from the group consisting of glass and plastic serving also as a protective element for said screen and disposed forwardly thereof, said sound waves, by virtue of the disposition of said element relative to said screen, moving in paths substantially perpendicular and in line with and directly forwardly of said screen.